(12) United States Patent
Francke et al.

(10) Patent No.: US 6,627,897 B1
(45) Date of Patent: Sep. 30, 2003

(54) DETECTION OF IONIZING RADIATION (75) Inventors: Tom Francke, Sollentuna (SE); Vladimir Peskov, Stockholm (SE)

(73) Assignee: Xcounter AB, Danderyd (SE)

( * ) Notice: Subject to any disclaimer, the term of this patent is extended or adjusted under 35 U.S.C. 154(b) by 0 days.

(21) Appl. No.: 09/909,869

(22) Filed: Jul. 23, 2001

(30) Foreign Application Priority Data

Jun. 13, 2001 (SE) ................................................ 0102097

(51) Int. Cl.$^7$ ................................................ G01T 1/185
(52) U.S. Cl. ..................... 250/385.1; 250/374; 250/375
(58) Field of Search ............................ 250/385.1, 374, 250/375, 382, 389

(56) References Cited

U.S. PATENT DOCUMENTS

| | | | |
|---|---|---|---|
| 4,912,736 A | 3/1990 | Drouet et al. | |
| 5,198,673 A | 3/1993 | Rougeot et al. | |
| 5,602,397 A | 2/1997 | Pitts et al. | |
| 6,414,317 B1 * | 7/2002 | Francke et al. | 250/385.1 |
| 6,437,339 B2 * | 8/2002 | Lee et al. | 250/370.09 |

FOREIGN PATENT DOCUMENTS

SE     514 475     10/2000

OTHER PUBLICATIONS

Bogomolov et al, Photoelectric Polling of Multiwire Gas Counters, pp. 639–642 (1978).

Charpak, Nuclear Instruments and Methods in Physics Research A310, pp. 47–56 (1991).

* cited by examiner

Primary Examiner—Constantine Hannaher
Assistant Examiner—Timothy Moran
(74) Attorney, Agent, or Firm—Birch, Stewart, Kolasch & Birch, LLP (57) ABSTRACT

The present invention describes an apparatus for detection of ionizing radiation, wherein the incident radiation ionizes a substance, and the electrons released as a result thereof are accelerated in a dual parallel plate electrode arrangement. These electrons will interact with a scintillating substance to emit light, which is detected by a position sensitive light detector. Since the light is emitted isotropically in such scintillator measures are taken to achieve a good spatial resolution. Thus, the scintillating substance is either arranged in an array of separately located scintillating elements, wherein each scintillating element is separated from the other ones by means of a light impermeable wall, or has an extension in the direction of the accelerated electrons shorter than the absorption length of the light photons emitted in the scintillating substance.

31 Claims, 4 Drawing Sheets

DETECTION OF IONIZING RADIATION

TECHNICAL FIELD OF THE INVENTION

The present invention generally relates to apparatus and methods for detection of ionizing radiation, particularly but not exclusively X-rays, and is usable in a variety of fields including e.g. medical radiology, computerized tomography (CT), microscopy, and non-destructive testing.

DESCRIPTION OF RELATED ART AND BACKGROUND OF THE INVENTION

Gaseous avalanche detectors, in general, are very attractive for detection of ionizing radiation. The main advantages of these detectors are that they are cheap to manufacture compared to e.g. solid state detectors, and that they can employ gas multiplication to strongly (on many orders of magnitude) amplify the signal amplitudes.

In a typical gaseous detector, an incident photon interacts with a gas atom, which as a result thereof emits a primary ionization electron, which electron in turn produces electron-ion pairs that are further multiplied in a gas avalanche, and this avalanche is detected in a position sensitive readout arrangement by means of integrating the charge induced by the avalanche, or by simply counting the avalanche. By such approach, single-photon detection can be performed.

One commonly employed detector of this kind is the multiwire proportional chamber, see e.g. S. E. Baru et al., Multiwire proportional chamber for a digital radiographic installation, Nuclear Instruments and Methods in Physics Research A, Vol. 283 (Nov. 10, 1989), pp. 431–435. In its basic configuration, the multiwire proportional chamber includes of a set of thin anode wires stretched between, and parallel with, two cathode planes. Application of a voltage between the anode wires and the cathode planes creates an electric field within the chamber. Electrons emitted in the gas by ionization of gas atoms, caused by incident radiation photons, drift towards the anode wires, and when approaching the thin wires they enter a strong electric field and experience ionizing interactions with gas molecules. The ensuing avalanche multiplication of electrons provides a noiseless amplification of the charge signal, by a factor as large as $10^5$ or more.

In another similar approach the charge induced by the avalanche electrons is not detected, but visible light emitted as a result of interaction between the avalanche-multiplied electrons and the gas atoms is detected by means of a standard light detection arrangement.

Such light polling method is described in G. D. Bogomolov, Yu.V. Dubrovskii and V. D. Peskov, Photoelectric polling of multiwire gas counters, Institute of Physics Problems, Academy of Sciences of the USSR, Moscow, Plenum Publishing Corporation, 1978, translated from Pribory i Tekhnika Eksperimenta, No. 3, pp. 84–86, May-June, 1978, wherein weak visible radiation of the avalanches near the anode wires is registered. Gas mixtures of He and Xe or Ar and $N_2$ with small amounts of quenching additives such as toluene were used, the purpose of the additives being to suppress secondary processes in the gas mixtures to thereby provide for position sensitive measurements.

Another similar approach is disclosed in G. Charpak, Light-emitting projection chambers for the study of rare processes in particle physics, Nuclear Instruments and Methods in Physics Research, A310, pp. 47–56, 1991. The use of TEA (triethylamine)

Drawbacks of such light polling technique include the need of quenching additives to achieve a position sensitive detection and the need of light emitting additives to provide high yield of light. These additives are chemically aggressive and cause damage to the instrument, especially when ionized by radiation. Furthermore, they emit light preferably in the UV and VUV region which is why the exit window needs to be made of quartz of UV-transmitting crystals which makes the instrument expensive and complicated. Furthermore, the light detector needs to be sensitive to UV-light.

Further, the need for providing sufficient space for wire mounting and high voltage isolation results in losses of X-ray detection efficiency.

Still further, the use of radial wires to solve the parallax problem results in a position resolution limited by the smallest practical anode wire pitch of about 1 mm. Yet further, the use of thin wires (typically less than 100 μm in diameter) in multiwire proportional chambers makes them difficult to construct, and reduces reliability, since one broken wire disables operation of the whole detector.

A particular problem using multiwire proportional chambers for medical imaging is the space charge effect that degrades the detector performance at high X-ray fluxes above 10 $kHz/mm^2$.

SUMMARY OF THE INVENTION

Accordingly, it is an object of the present invention to provide an apparatus and method for detection of ionizing radiation, particularly X-rays, which use avalanche amplification and which avoid the above-mentioned problems associated with the prior art.

In this respect there is a particular object of the invention to provide for very high spatial resolution without the need of adding quenching additives to the avalanche amplification substance.

A further object of the invention to provide for light emission without the need of adding chemically aggressive additives to the avalanche amplification substance.

A further object of the invention is to provide such detection apparatus and method, which provide for high signal-to-noise ratios and high sensitivity.

Still a further object of the invention is to provide such detection apparatus and method, wherein isotropically emitted light from the electron avalanches is forced to illuminate a small area of the detector arrangement only to further improve the spatial resolution.

Yet a further object of the present invention is to provide such detection apparatus and method, which are effective, fast, accurate, reliable, and of low cost.

Still a further object of the invention is to provide a device for use in planar beam radiography, which includes a plurality of detection apparatus that attain the above-said objects.

These objects among others are, according to the present invention, attained by apparatus, devices and methods as claimed in the appended claims.

By detecting light emitted from interactions between accelerated electrons and a scintillating substance, which may be the same substance as the one used for ionization and optionally for used for electron avalanche amplification, or may be a separate substance, in geometrically limited regions to obtain geometrical discrimination of light emitted in unwanted directions, an improved spatial resolution is achieved.

The scintillating substance is preferably a noble gas, nitrogen or a combination thereof. These gases are not aggressive to the detector. They emit light preferably in the UV region, and therefore the detector can optionally be equipped with a wavelength shifter at the exit window to convert the UV light to visible light to simplify the construction.

The geometrically limited regions may be an array of separately located scintillating elements, wherein each scintillating element is separated from the other ones by means of a light impermeable wall such that light emitted in anyone of said scintillating elements is prevented from reaching any other ones of the scintillating elements.

Alternatively, the scintillating substance has an extension in the direction of the accelerated electrons shorter than the absorption length of the photons in the substance, typically less than 1 mm, such that a major fraction of light emitted in the scintillating substance is prevented from being re-absorbed in said scintillating substance, and to thereby cause a further photon to be emitted and affect the spatial resolution of said position sensitive light detection arrangement adversely.

The light detecting arrangement, e.g. a lens and a CCD camera or a light sensitive TFT, includes an array of light detecting elements, i.e. pixels, wherein each pixel preferably is arranged to detect light emitted from a respective one of the array of separately located scintillating elements.

By such arrangement a low-cost position-readout system having a large number of channels to obtain high resolution is achieved.

By geometrical discrimination to avoid feedback of scintillating light, the detector may be used at higher amplification levels than the detectors described in the prior art.

Further, the detector apparatus may be provided as a modular system, wherein all portions but the light detecting arrangement is provided as a first module, an amplification and conversion module, whereas the light detecting arrangement constitutes a second module, where the modules can be releasably attached and aligned prior to use. Such solution is very flexible and provides for the use of particular light detecting arrangements, e.g. including a fiber coupler, a magnification lens, light sensitive TFT, or an image intensifier, in some applications.

Further characteristics of the invention and advantages thereof will be evident from the detailed description of preferred embodiments of the present invention given hereinafter and the accompanying FIGS. 1–8, which are given by way of illustration only, and thus are not limitative of the present invention.

BRIEF DESCRIPTION OF THE DRAWINGS

Identical reference numerals are used throughout the Figures to denote identical or similar components, portions, details and the like of the various embodiments.

DETAILED DESCRIPTION OF PREFERRED EMBODIMENTS

Figure 1:
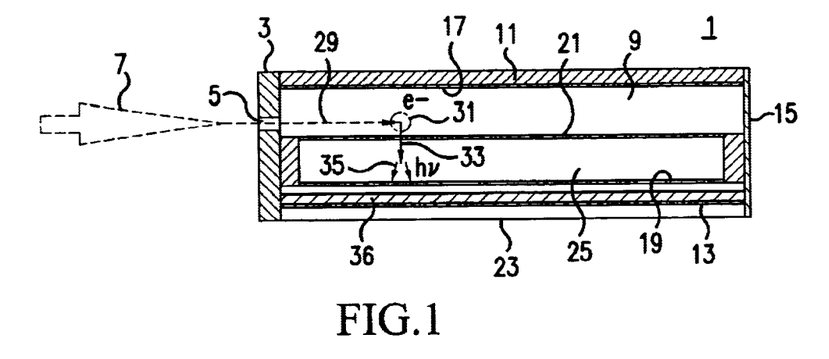
FIG. 1 illustrates schematically, in a cross-sectional side view, a detection apparatus according to a first embodiment of the present invention
Figure 2:
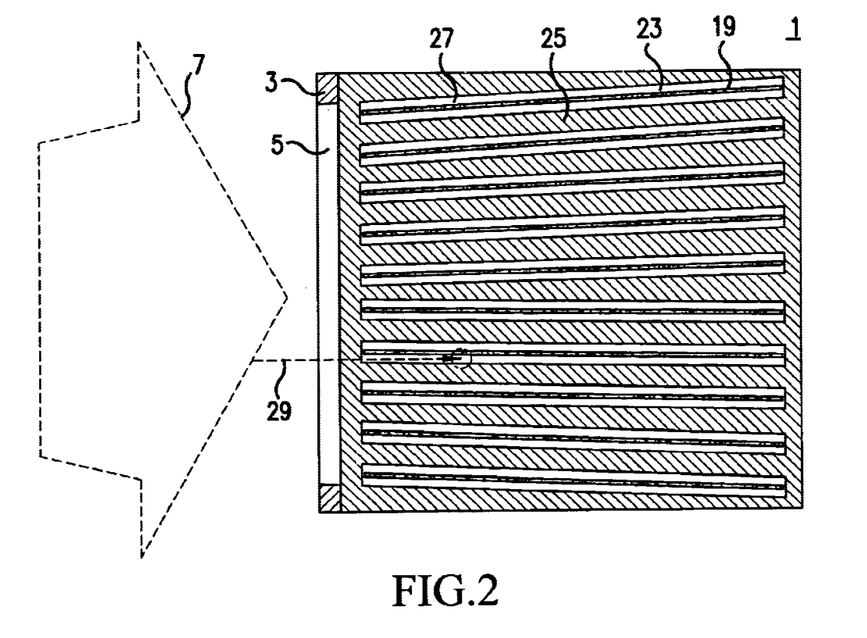
FIG. 2 illustrates schematically, in a cross sectional top view, the detection apparatus of FIG. 1.
Figure 3:
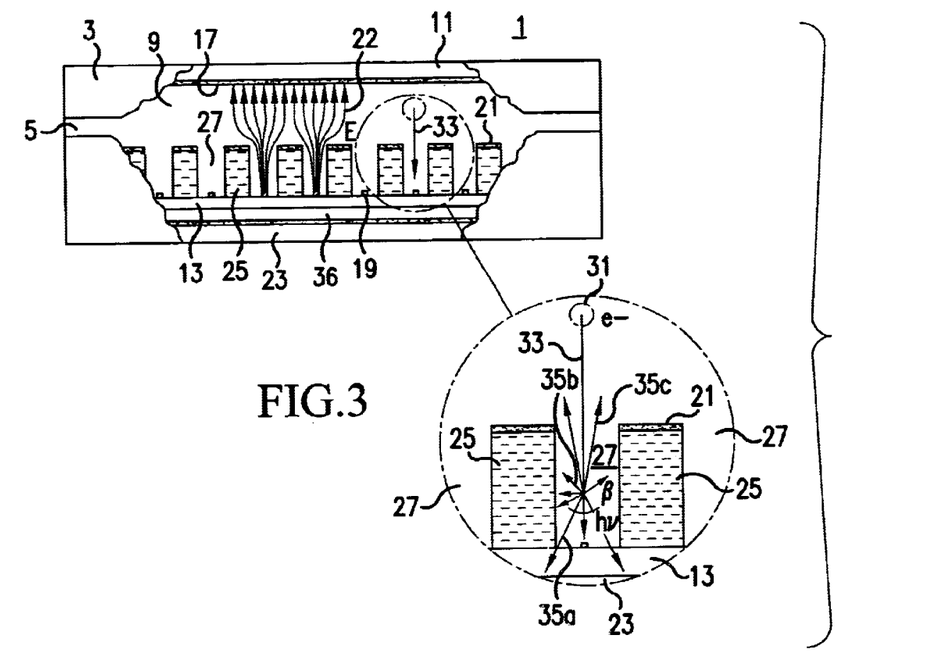
FIG. 3 illustrates schematically, in a front view with collimator portions cut-away, the detection apparatus of FIG. 1, wherein the details in the encircled region are partially enlarged in the right-hand bottom corner of the Figure.

With reference to FIGS. 1–3, which schematically, in cross-sectional side and top views, respectively, and in a front view with collimator portions cut-away, illustrate an apparatus 1 for detection of ionizing radiation, a first embodiment of the present invention will be depicted.

Apparatus 1 comprises a collimator 3, which includes a radiation entrance in the form of a window 5 transparent to ionizable radiation, such as a planar beam 7 of ionizing radiation. A chamber 9, preferably a gas or liquid tight chamber, is enclosed by an upper wall 11, a lower window 13, side walls 15, and collimator 3, and is filled with an ionizable substance, which is also suitable for electron avalanche amplification and for light polling, i.e. which emits light as a result of interaction between the electrons and the substance, see further discussion below. The substance is preferably a gas such as a noble gas, nitrogen or a combination thereof. It can also be a noble gas in liquid or solid form.

Further, apparatus 1 comprises an electrode arrangement including a cathode 17, an anode 19, and an acceleration or amplification electrode 21 arranged in between the cathode 17 and the anode 19. The electrodes are essentially planar and parallel with each other and oriented with respect to the radiation entrance 5 such that the radiation can enter the detector apparatus between, and substantially parallel with, cathode 17 and electrode 21. In FIGS. 1–3 cathode 17 is provided as a rectangular layer or plate possibly supported by wall 11, anode 19 is provided as strips or wires possibly supported by window 13 and pointing towards the source of radiation beam 7, and electrode 21 is provided as stripes or a mesh, also pointing towards the source of radiation beam 7. Nevertheless, the electrodes may have other design.

During use, the electrodes are held at electric potentials such that a weak drift field is created between cathode 17 and electrode 21 for drift of electrons released as a result of ionization of the substance in chamber 9, and a strong amplification field is created between electrode 21 and anode 19 for avalanche multiplication of electrons drifted into the strong field. The fields are schematically indicated by electric field lines 22 in FIG. 3.

Still further, apparatus 1 comprises a light detecting arrangement 23 adjacent window 13 for detection of light hv emitted as a result of interaction between the avalanche amplified electrons and the substance in chamber 13.

According to the invention, the volume between electrode 21 and anode 19 is arranged as an array of separately located scintillating or fluorescing regions 27, wherein each such scintillating region is separated from the other ones by means of a light impermeable wall 25 such that light emitted in anyone of scintillating regions 27 is prevented from reaching any other ones of the scintillating regions 27.

Further, the light detecting arrangement 23 includes a one dimensional array of light detecting elements (not illustrated), wherein each light detecting element is arranged to detect light emitted in a respective one of the array of separately located scintillating regions 27. By such provision one-dimensional imaging of planar beam 7 with high spatial resolution is achieved.

In an alternative embodiment, the light detecting arrangement 23 includes a two dimensional array of light detecting elements (not illustrated), wherein multiple light detecting elements are arranged to detect light emitted in a respective one of the array of separately located scintillating regions 27. By such provision one-dimensional imaging of planar beam 7 with high spatial resolution is achieved, together with a profile in a direction parallel to the incoming x-ray flux of the intensity of the emitted light. This profile can be used to measure the energy spectrum of the incoming x-ray flux impinging on each scintillating region.

The operation of apparatus 1 will next be discussed by means of an exemplary photon 29 entered into chamber 9. Such photon will pass through the ionizable substance in chamber 9 and will eventually be absorbed therein, e.g. at 31. As a result thereof an atom or molecule of the substance will be ionized and release a photoelectron e–. This photoelectron has a high kinetic energy and further ionizes the substance, in total liberating up to a few thousand electrons. These electrons experience the weak drift field and are thus drifted towards electrode 21. Due to the strong avalanche amplification field between electrode 21 and anode 19 the drifted electrons will be forced to pass through the electrode 21 and enter the strong avalanche amplification field. Thus, the electrons are accelerated towards the anode 19 and cause through interactions with the substance in chamber 9 a large number of secondary electrons to be released. These secondary electrons will also be accelerated and cause further electrons to be released such that an avalanche multiplication of electrons is achieved. The movement of the photoelectron, and subsequently released electrons, is schematically indicated by arrow 33 in FIGS. 1 and 2.

The electrons will also cause emission of light (VUV, UV and/or visible light) and this emission of light will predominantly take place where the number of liberated electrons is high, i.e. in a region 27 close to the anode 19. Such light is typically emitted isotropically, but some light photons (indicated by 35 in FIG. 1) will pass through window 13 and will be detected by light detecting arrangement 23. If predominantly UV photons are emitted a UV light-to-visible light converter or frequency shifter (schematically indicated by 36 in FIG. 1) may be provided between window 13 and detecting arrangement (as illustrated) or between anode 19 and window 13 (not illustrated) to allow the detecting arrangement to be sensitive to visible light the light detecting arrangement 23 may.

In order to achieve a high spatial resolution of the measurement performed the light impermeable walls 25 shall prevent any light emitted in a region 27 from reaching another region 27 and to therein interact with atoms or molecules and cause further photons to be emitted, as these photons will deteriorate the spatial resolution and blur images achieved.

The blocking mechanism in the light impermeable walls 25 is clearly illustrated of in the enlarged encircled region of the FIG. 3. Photons emitted within the angle β, denoted by 35a, are leaving region 27 through window 13 to be detected in a single detection element (optionally after having been converted into visible light in wavelength shifter 36), whereas photons, denoted 35b, emitted in directions essentially perpendicular to the direction of the accelerated electrons are blocked by walls 25. Photons, denoted 35c, emitted towards cathode 17 are allowed to leave region 27 as long as they cause possible further electrons to be released in areas such that these electrons are accelerated into the very same region 25 and/or cause further photons to be emitted, which will not affect the detection particularly especially adversely.

By making the drift region 9 thinner than one interaction length of these photons, typically a millimeter, this process is significantly reduced. shall in this respect be appreciated that regions 27 and walls 25 (and electrode 21 and anode 19) may be designed in other manners as long as they fulfil their duties. Particularly, an arrangement wherein the distance between adjacent stripes of electrode 21 is small and the width of regions are wide will cause photons not leaving through window 13 to be trapped (i.e. photons denoted 35c in FIG. 3 will in a great extent be prevented from reaching the drift field areas). If the intensity of the detected signal will be used to estimate the energy of the incident radiation photon such approach would be advantageous.

Further, walls 25 may be made of a light absorbing or reflecting material, or surfaces 25a of walls 25 facing regions may be covered by such material. Particularly, in a detector where walls 25 are formed so as to trap photons within regions 27 walls 25 or surfaces thereof can be made of a light reflecting material to maximize the light intensity to the light detection arrangement 23. Some photons will experience multiple reflections at the walls 25 to eventually hit the optional wavelength shifter and exit through window 13 and be detected.

It shall further be appreciated that the walls may extend on upper side of the electrode 21 all the way up to the cathode 17 to define separate regions where ionization, drift of electrons and amplification of photons, and possibly electrons take place (not illustrated). In such design there is no risk of crosstalk between the regions or the light detecting elements of light detecting arrangement 23.

It shall still further be appreciated that the voltage may be selected such that no avalanche multiplication occur, but such that the initially liberated electrons are accelerated towards the anode to cause large amounts of light to be emitted in the scintillating substance close to the anode. In such manner a light amplification is obtained (light emitted in the scintillating substance compared to the light emitted in the ionization region), but no electron amplification (i.e. the number of electrons entering the scintillating substance is substantially the same as the number of electrons liberated in the in the ionization region). By such approach an increased spectral resolution may be obtained since the light emitted will be more related to the spectral content of the incident radiation photon than if electron avalanches would be used (since the distribution of amount of generated electrons would be broader with avalanche amplification).

Figure 4:
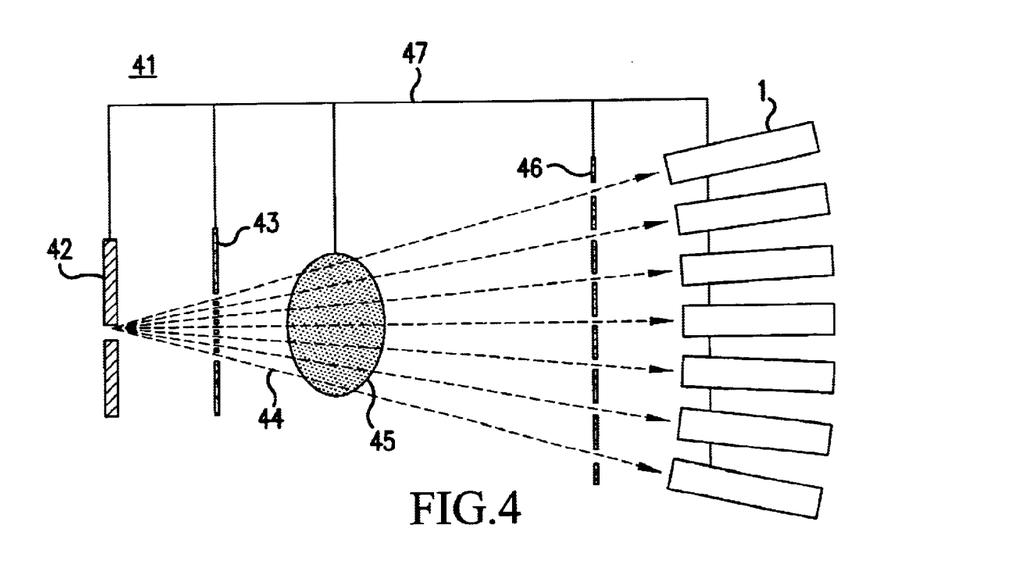
FIG. 4 illustrates schematically, in a side view, a device for use in planar beam radiography including a plurality of the detection apparatus of FIG. 1 arranged in a stacked configuration according to a second embodiment of the present invention.

With reference next to FIG. 4, a multi-line configuration 41, where a number of detectors are stacked, will be described.

Multi-line configuration 41 includes a plurality of the detector apparatus 1 of FIGS. 1–3 arranged side-by-side in a stacked configuration. By such device multi-line scan can be achieved, which reduces the overall scanning distance, as well as the scanning time. The device 41 includes an X-ray source 42, which together with a number of optional collimator windows 43 produces a number of planar fan-shaped X-ray beams 44, for irradiation of the object 45 to be imaged. The beams transmitted through the object 45 enter the individual stacked detectors 1 through a number of optional second collimator windows 46, which are aligned with the X-ray beams. The X-ray source 42, the first collimator windows 43, the second collimator windows 46, and the detector apparatus 1, are fixed to each other by means of a frame or support 47.

The so formed device 41 for radiography can be moved as a unit to scan an object, which is to be examined. In this multi-line configuration, the scanning can be done in a transverse or rotational movement, perpendicular to the X-ray beam. It can also be advantageous if the device for radiography is fixed and the object to be imaged is moved.

Figure 5:
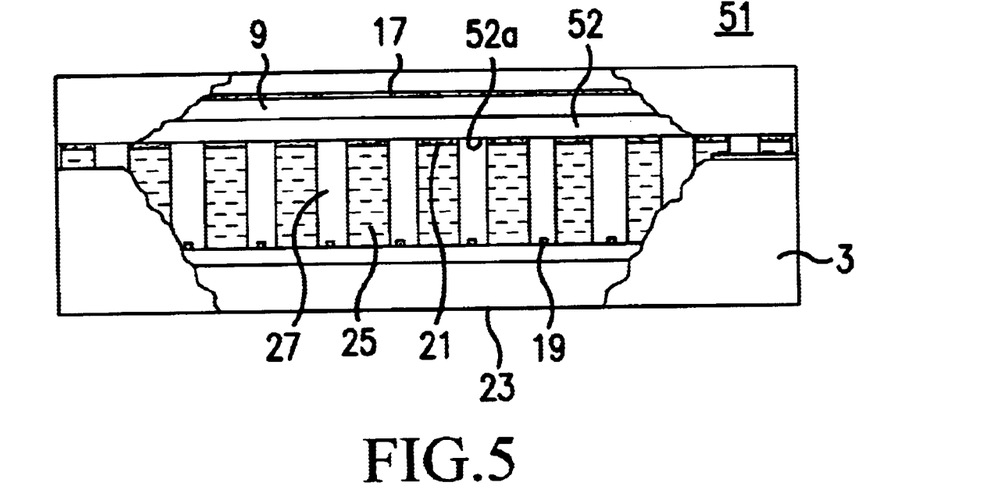
FIG. 5 illustrates schematically, in a front view with collimator portions cut-away, a detection apparatus according to a third embodiment of the present invention.

With reference next to FIG. 5 a further embodiment 51 of the detection apparatus of the present invention will shortly be depicted.

This embodiment 51 differs from the embodiment of FIGS. 1–3 in that a solid photo-converting material or photocathode 52 is arranged in an upper region of chamber 9 on top of the electrode 21, and the radiation entrance 5 is positioned with respect to the light impermeable walls 25 such that incident radiation will enter the detector beneath photo-converting material 52.

Further, the optional frequency converter 36 is not illustrated in FIG. 5, but may, nevertheless, be used with this as well as any other depicted embodiment in the present description.

During use the detector is tilted with respect to the incident radiation beam such that the beam impinges onto the bottom surface 52a of at an inclined angle. The angle can be very small, i.e. be a grazing angle, such that a major length of the surface 52a, in the direction of the radiation beam, is irradiated. The photo-converting material 52 emits photoelectrons in response to being irradiated by the radiation beam and these photoelectrons are accelerated towards the anode 19, and possibly multiplied, by means of the strong electric field in regions 27. As in previous embodiment the accelerated electrons interact with the scintillating material within regions 27 to emit light, which is subsequently detected by light detection arrangement 23.

It shall be appreciated that the photo converting solid 52 in the FIG. 5 embodiment may be connected to an electric potential to modify the electric field within chamber 9. In such instance, either one or both of the electrodes 17 and 21 may be dispensed with and the photo-converting solid 52, operating as a cathode, and the anode 19 may be held at electric potentials to create a suitable acceleration field within regions 27.

Figure 6:
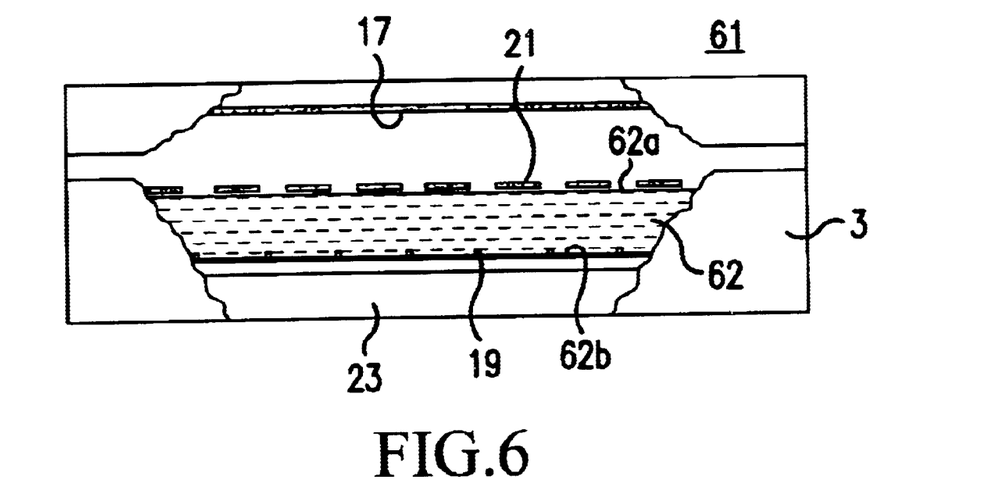
FIG. 6 illustrates schematically, in a front view with collimator portions cut-away, a detection apparatus according to a fourth embodiment of the present invention.

With reference next to FIG. 6 yet a further embodiment 61 of the detection apparatus of the present invention differs from the FIGS. 1–3 embodiment in that a solid scintillator 62 is arranged between electrode 21 and anode 19, instead of the light impermeable walls 25 defining the regions 27. Hence, electrons released in chamber 9 are accelerated towards scintillator 62 and light photons are emitted in scintillator 62 as a result of interaction with impinging electrons. In order to achieve a high spatial resolution the scintillator 62 is provided with a matrix of scintillating elements (not illustrated) extending from an upper surface 62a to a lower surface 62b of the scintillator 62, where the scintillating elements are each separated from the other ones by light impermeable walls.

Figure 7:
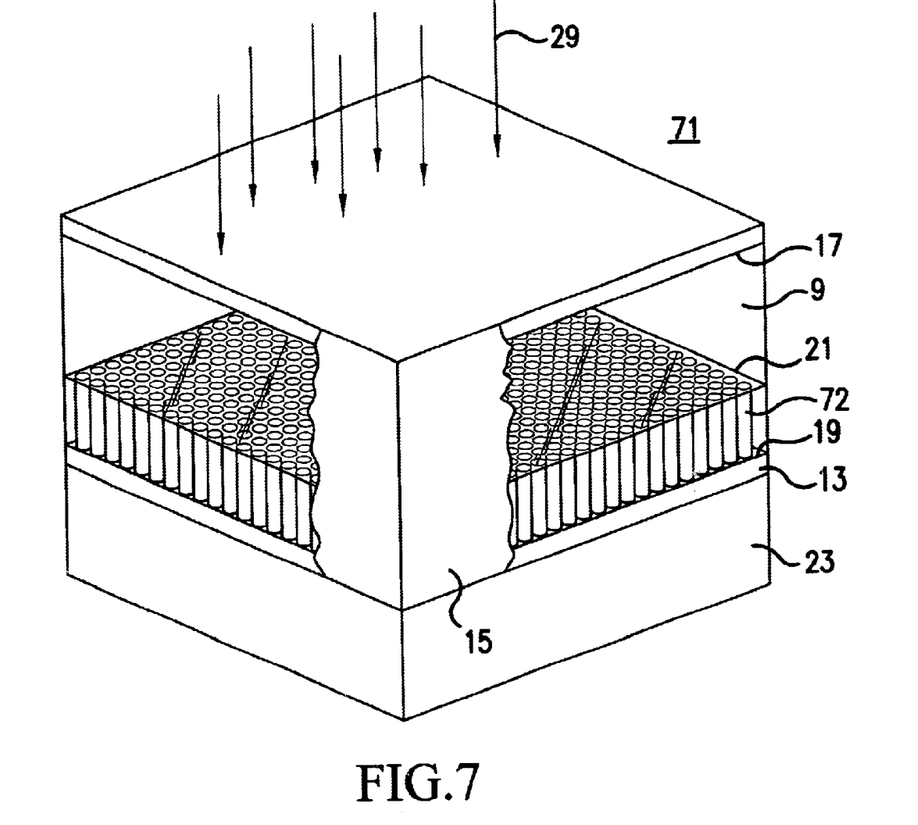
FIG. 7 illustrates schematically, in a perspective view with collimator portions cut-away, a detection apparatus according to a fifth embodiment of the present invention.

With reference next to FIG. 7 a further embodiment 71 of the detection apparatus of the present invention will shortly be depicted.

Embodiment 71 is a 2D detector, wherein incident photons 29 of preferably an unfocused radiation beam are arranged to enter detector chamber 9 through the cathode 17, preferably essentially perpendicular to the cathode 17. Cathode 17, light permeable exit window 13 and sidewalls 15 (of which parts are cut away to schematically illustrate the interior of detector 71) define gas-tight chamber 9, which is filled with an ionizable and scintillating gas or liquid. At the exit window there is arranged the anode 19, which may in this case be a grid-like structure or similar that allow a large amount of light to be passed out through exit window 13. Above the anode there is a micro channel plate 72 or other kind of light impermeable tubes or walls separating in a light impermeable manner a number of light emitting regions, which are filled with the ionizable and scintillating gas or liquid. At the upper side of the tube matrix structure 72 the electrode 21 is arranged, here in the form of a conductive sheet or layer having a matrix of holes or apertures such that each hole or aperture is overlying a respective tube opening of the tube matrix structure 72. Further, at the exit window 13 there is arranged the light detection arrangement 23, here in the form of a two-dimensional detector.

During use, the electrodes 17, 19 and 21 are held at electric potentials such that a weak drift field is created between electrodes 17 and 21 and a stronger acceleration or avalanche field is created between electrodes 21 and 19. Thus, incident radiation photons are caused ionize the gas or liquid in the upper section of chamber 9. Electrons released during ionization are causing secondary electrons to be released and all these electrons are drifted towards the electrode 21. Close to the electrode the electrons are accelerated and are passed through the holes or apertures of the electrode 21 and through one or multiple tubes of the tube arrangement 72 towards the anode. During the travel of the electrons in the strong electric field they achieve an increased kinetic energy, and optionally they are multiplied to yield further electrons that are accelerated towards the anode 19. Through interactions between the electrons and the gas or liquid within the tube(s) light is emitted, which is passed through exit window 13 and is subsequently detected by the two-dimensional detector 23. In such manner two-dimensional imaging of the incident radiation may be achieved.

It shall be appreciated that the tubes of the tube matrix structure alternatively are solid and made of a light scintillating material to provide for a similar operation.

Figure 8:
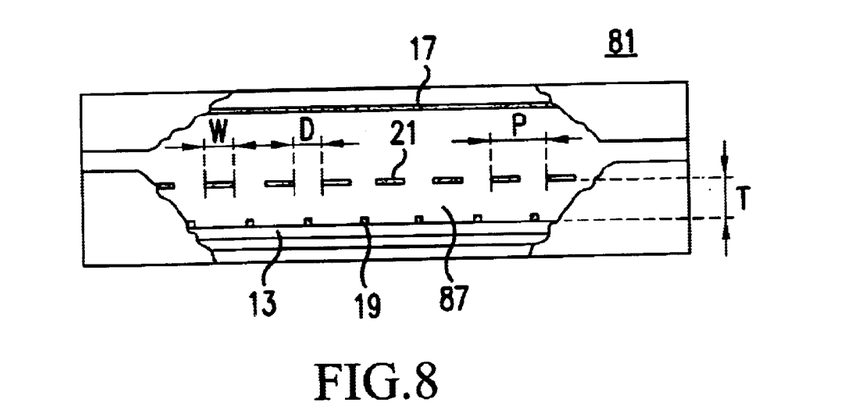
FIG. 8 illustrates schematically, in a front view with collimator portions cut-away, a detection apparatus according to a sixth embodiment of the present invention.

With reference finally to FIG. 8 a further embodiment of the detection apparatus of the present invention will shortly be depicted. This detector is lacking the light impermeable walls 25 defining the regions 27, but in other respects the detector composition is identical with the FIGS. 1–3 embodiment.

In order to obtain a good spatial resolution geometrical discrimination of scintillating light is needed, and when walls 25 are omitted other measures are provided.

According to the present invention the detector embodiment of FIG. 8 is providing for a good spatial resolution by means of the thickness T of the chamber section between electrodes 21 and 19. Thus, the thickness T shall be shorter than the absorption length of the light photons emitted in the scintillating substance, typically less than 1 mm, such that a major fraction of the light emitted in the chamber section between electrodes 21 and 19 is prevented from being re-absorbed in that chamber section and to thereby cause a further photon to be emitted and affect the spatial resolution adversely.

Advantageously, the electrode 21 has small holes or apertures such that the probability that a photon emitted in the chamber section between the electrodes 21 and 19 is reaching the chamber section between electrodes 17 and 21.

Preferred exemplary geometries are then as follows. The width W of the stripes or wires of electrode 21 may be at least 0.1 mm, and preferably in the range of 0.5–1 mm; the stripes or wires of electrode 21 may be spaced apart, i.e. defining a pitch P, of at least 0.2 mm, and preferably in the range of 1–2 mm; and the distance D between the stripes or wires of electrode 21 (i.e. the width of the holes or apertures in electrode 21) may be in the range of 0.1–1 mm.

It shall be appreciated that the electrode arrangement in the detector embodiments may be comprised of a dual parallel plate arrangement only, and thus the electrode 21 may be dispensed with, provided that the voltage between the cathode 17 and anode 19 is kept high enough to cause avalanche amplification or at least acceleration of the electrons released during ionization. In the FIG. 8 embodiment the discussion relating to the thickness T of the avalanche regions (i.e. distance between electrode 21 and anode 19) will in such case refer to the distance between the dual plates, i.e. cathode 17 and anode 19.

It shall further be appreciated that any one of the detector embodiments of FIGS. 5, 6 or 8 may be used in the device of FIG. 4 instead of the detector embodiment of FIGS. 1–3.

It shall still further be appreciated that any one of the detector embodiments described above may be provided with a acceleration electrode between electrodes 17 and 21 or between electrodes 21 and 19, and held, during use, at a suitable electric potential to define a further acceleration or multiplication region (not illustrated).

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. An apparatus for detection of ionizing radiation comprising:
    a radiation entrance transparent to ionizable radiation;
    an ionizable substance arranged such that ionizable radiation entered through said radiation entrance can ionize said ionizable substance;
    an electrode arrangement connected to a voltage supply for applying an electric field in said apparatus such that electrons released during ionization of said ionizable substance are accelerated;
    a scintillating substance adapted to emit light in response to being struck by electrons, and arranged such that electrons accelerated by means of said electrode arrangement can strike said scintillating substance; and
    a position sensitive light detection arrangement for detecting light emitted in said scintillating substance spatially resolved; wherein
    said electrode arrangement includes a dual parallel plate arrangement;
    said scintillating substance is arranged in an array of separately located scintillating elements, wherein each scintillating element is separated from the other ones by means of a light impermeable wall such that light emitted in anyone of said scintillating elements is prevented from reaching any other ones of said scintillating elements; and
    said light detecting arrangement includes an array of light detecting elements, wherein each light detecting element is arranged to detect light emitted from a respective one of said array of separately located scintillating elements.

2. The apparatus as claimed in claim 1 wherein a substance suitable for electron avalanche amplification is arranged such that electrons are accelerated in said substance suitable for electron avalanche amplification to be avalanche multiplied.

3. The apparatus as claimed in claim 2 wherein said ionizable substance and said substance suitable for electron avalanche amplification are the same substance.

4. The apparatus as claimed in claim 3 wherein said same substance is a gas contained in a chamber.

5. The apparatus as claimed in claim 4 wherein said gas is a noble gas, nitrogen or a combination thereof.

6. The apparatus as claimed in claim 3 wherein said scintillating substance is the same substance as said ionizable substance and said substance suitable for electron avalanche amplification.

7. The apparatus as claimed in claim 6 wherein each scintillating element in said array of separately located scintillating elements also constitutes an avalanche multiplication volume, and wherein the electrode arrangement is arranged to apply said electric field such that a major fraction of said electrons released during ionization of said ionizable substance are avalanche multiplied within said avalanche multiplication volumes.

8. The apparatus as claimed in claim 7 wherein said electrode arrangement includes a third electrode arranged within said dual plate arrangement, said third electrode being permeable to electrons, and particularly including an array of holes for electrons to pass through, wherein each hole is overlying a respective scintillating element.

9. The apparatus as claimed in claim 1 wherein said scintillating substance is a solid material.

10. The apparatus as claimed in claim 9 wherein said electrode arrangement includes a third electrode, where said layer is formed on a surface of said scintillating solid material.

11. The apparatus as claimed in claim 10 wherein the light detection arrangement is arranged facing a first surface of the scintillating solid material and wherein the scintillating solid material is oriented such that the electrons accelerated by means of said electrode arrangement can strike a second surface of said scintillating material, said first and second surfaces facing essentially opposite directions.

12. The apparatus as claimed in claim 11 wherein said second surface is covered by a light absorbing or reflecting layer.

13. The apparatus as claimed in claim 11 wherein each of said scintillating elements extends from said first to said second surface, and wherein each of said scintillating elements is optically connected to a respective one of said light detecting elements.

14. The apparatus as claimed in claim 1 wherein said ionizable substance is a solid photo-converting material.

15. The apparatus as claimed in claim 1 wherein said scintillating substance has an extension in the direction of the accelerated electrons, which is shorter than the absorption length of the light photons emitted in the scintillating substance, typically less than 1 mm.

16. The apparatus as claimed in claim 1 wherein said electrode arrangement is oriented with respect to said radiation entrance such that electrons released during ionization of said ionizable substance are accelerated in a direction essentially perpendicular to the direction, in which said radiation is entered through said radiation entrance.

17. The apparatus as claimed in claim 16 wherein the radiation entrance is arranged such that a planar radiation beam can enter the ionizable substance, and the array of light detecting elements are arranged side by side, such that each light detecting element can separately detect light derivable from absorption by a respective transversely separated portion of said planar radiation beam, whereby one-dimensional imaging of said planar radiation beam is enabled.

18. The apparatus as claimed in claim 16 wherein the light detection arrangement includes an array of light detecting elements located one after the other in the direction of the entered radiation, such that each of the detecting elements located one after the other can separately detect light derivable from absorption by said radiation at different locations along the radiation path, whereby a spectral content of said entered radiation is resolvable.

19. A device for use in planar beam radiography comprising an X-ray source, means for forming an essentially planar X-ray beam located between said X-ray source and an object to be imaged, and the detector as claimed in claim 16 located and arranged for detection of the planar X-ray beam as transmitted through or reflected off said object.

20. The device as claimed in claim 19 wherein said detector is a first detector, said device further comprising a second detector of the same type as said first detector, where the first and second detectors are stacked to form a detector unit, and means for forming an essentially planar X-ray beam for each of said first and second detectors, said means being located between said X-ray source and said object, wherein each of said first and second detectors is located and arranged for detection the respective planar X-ray beam as transmitted through or reflected off said object.

21. The apparatus as claimed in claim 1 wherein said electrode arrangement is oriented with respect to said radiation entrance such that ionizable radiation can enter said ionizable substance by travelling through one of said dual parallel plate electrodes; and such that electrons released during ionization of said ionizable substance are accelerated in a direction essentially parallel to the direction, in which said radiation enters through said radiation entrance.

22. The apparatus as claimed in claim 21 wherein the radiation entrance is arranged such that an unfocused radiation beam can enter the ionizable substance, and the array of light detecting elements is arranged side by side in a two-dimensional matrix, such that each light detecting element can separately detect light derivable from absorption by a respective transversely separated portion of said unfocused radiation beam, whereby two-dimensional imaging of said unfocused radiation beam is enabled.

23. The apparatus as claimed in claim 1 wherein said light detecting elements are photodiodes, photosensitive TFT's, photosensitive gaseous detectors, photodiode-based amplifiers or CCD elements.

24. The apparatus as claimed in claim 1 wherein said light-detecting arrangement includes a frequency converter for frequency converting said scintillating light before being detected.

25. A method for detection of ionizing radiation in a detector apparatus comprising the steps of:

entering ionizable radiation through a radiation entrance transparent to ionizable radiation;

ionizing an ionizable substance by means of said ionizing radiation;

accelerating electrons released during ionization of said ionizable substance towards a scintillating substance by means of applying an electrical field between two electrodes, wherein scintillating light is produced in said scintillating substance in response to said accelerated electrons; and detecting light produced in said scintillating substance spatially resolved by means of a position sensitive light detection arrangement; wherein said electrical field is applied in a dual parallel plate arrangement;

said scintillating light is produced in one of a plurality of separately located scintillating elements arranged in an array, wherein each scintillating element is separated from the other ones by means of a light impermeable wall such that said scintillating light produced in said one of said plurality of scintillating elements is prevented from reaching any other ones of said plurality of scintillating elements; and said light produced in said one of said plurality of scintillating elements is detected in one of a plurality of light detecting elements arranged in an array, wherein said one of said plurality of light detecting elements is uniquely determined by said one of said plurality of scintillating elements.

26. The method as claimed in claim 25 wherein said accelerated electrons are avalanche multiplied in a substance suitable for electron avalanche amplification.

27. The method as claimed in claim 26 wherein said ionizable substance, said substance suitable for electron avalanche amplification, and said scintillating substance is the same substance, and said same substance is a gas, particularly a noble gas, nitrogen or a combination thereof, contained in a chamber.

28. The method as claimed in claim 27 wherein each scintillating element in said array of separately located scintillating elements also constitutes a avalanche multiplication volume, and wherein said electric field is applied such that a major fraction of said electrons released during ionization of said ionizable substance are avalanche multiplied within said avalanche multiplication volumes.

29. The method as claimed in claim 25 wherein said scintillating substance is a solid or liquid material, and wherein said electrode arrangement includes a third electrode permeable to electrons, preferably including an array of holes for electrons to pass through.

30. An apparatus for detection of ionizing radiation comprising:

an radiation entrance transparent to ionizable radiation;

an ionizable substance arranged such that ionizable radiation entered through said radiation entrance can ionize said ionizable substance;

an electrode arrangement connectable to a voltage supply for applying an electric field in said apparatus such that electrons released during ionization of said ionizable substance are accelerated;

a scintillating substance adapted to emit light in response to being struck by electrons, and arranged such that electrons accelerated by means of said electrode arrangement can strike said scintillating substance;

a position sensitive light detection arrangement for detecting said light emitted in said scintillating substance spatially resolved; wherein said electrode arrangement is a dual parallel plate arrangement; and said scintillating substance has an extension in the direction of the accelerated electrons shorter than the absorption length of the light photons emitted in the scintillating substance, typically less than 1 mm, such that a major fraction of the light emitted in said scintillating substance is prevented from being re-absorbed in said scintillating substance, and to thereby cause a further photon to be emitted and affect the spatial resolution of said position sensitive light detection arrangement adversely.

31. A method for detection of ionizing radiation in a detector apparatus comprising the steps of:

entering ionizable radiation through a radiation entrance transparent to ionizable radiation;

ionizing an ionizable substance by means of said ionizing radiation;

accelerating electrons released during ionization of said ionizable substance towards a scintillating substance by means of applying an electrical field between two electrodes, wherein scintillating light is produced in said scintillating substance in response to said accelerated electrons; and detecting light produced in said scintillating substance spatially resolved by means of a position sensitive light detection arrangement; wherein said electrical field is applied in a dual parallel plate arrangement;

said scintillating light is produced in a scintillating substance having an extension in the direction of the accelerated electrons shorter than the absorption length of the light photons emitted in the scintillating substance, typically less than 1 mm, such that a major fraction of the light emitted in said scintillating substance is prevented from being re-absorbed in said scintillating substance, and to thereby cause a further photon to be emitted and affect the spatial resolution of said position sensitive light detection arrangement adversely.

* * * * *